(12) United States Patent
Eguchi et al.

(10) Patent No.: US 6,324,152 B1
(45) Date of Patent: Nov. 27, 2001

(54) DISC REPRODUCING APPARATUS WITH MOTOR BASE BEARING SYSTEM

(75) Inventors: Naoki Eguchi; Tsuyoshi Shimomichi, both of Kanagawa (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 08/924,258

(22) Filed: Sep. 5, 1997

(30) Foreign Application Priority Data

Sep. 6, 1996 (JP) .................................................... 8-236491

(51) Int. Cl.$^7$ .................................................. G11B 23/00
(52) U.S. Cl. .............................................................. 369/258
(58) Field of Search ................................... 369/258, 75.1, 369/75.2, 77.7, 77.2

(56) References Cited

U.S. PATENT DOCUMENTS

| | | | |
|---|---|---|---|
| 4,594,762 | * | 6/1986 | Och ..................................... 29/281.4 |
| 4,953,154 | * | 8/1990 | Takahara et al. ..................... 369/195 |
| 5,008,873 | * | 4/1991 | Tanaka et al. ....................... 369/44.1 |
| 5,182,739 | * | 1/1993 | Kine et al. ......................... 369/44.15 |
| 5,267,089 | * | 11/1993 | Yamamoto et al. .................. 359/822 |
| 5,768,248 | * | 6/1998 | Lee ..................................... 369/219 |

OTHER PUBLICATIONS

Patent Abstract of Japan vol. 008, No. 182 (M–319), Aug. 22, 1984 & JP 59 073621 A (Sanyo Denki KK; Others: 01), Apr. 25, 1984.
Patent Abstracts of Japan vol. 010, No. 351 (P–520), Nov. 27, 1986 & JP 61 150162 A (Ricoh Co Ltd), Jul. 8, 1986.
GB 2 085 635 A (Victor Company of Japan) Apr. 28, 1982.
Patent Abstracts of Japan vol. 010, No. 284 (P–501), Sep. 26, 1986 & JP 61 104335 A (Asahi Optical Co Ltd), May 22, 1986.
Patent Abstracts of Japan vol. 010, No. 225 (P–484), Aug. 6, 1986 & JP 61 061268 A (Mitsubishi Electric Corp), Mar. 29, 1986.
Patent Abstracts of Japan vol. 014, No. 050 (P–0998), Jan. 30, 1990 & JP 01 279459 A (Kenwood Corp) Nov. 9, 1989.
Patent Abstracts of Japan vol. 016, No 005 (P–1295), Jan. 8, 1992 & JP 03 228229 A (Hitachi Ltd), Oct. 9, 1991.

* cited by examiner

Primary Examiner—Brian E. Miller
Assistant Examiner—Tod Kupstas
(74) Attorney, Agent, or Firm—Pillsbury Winthrop LLP

(57) ABSTRACT

A disc reproducing includes, a motor for driving the disc, a turntable coupled to a motor shaft of the motor, a motor base for mounting the motor, a chassis for supporting the motor, a motor base bearing system mounted on the chassis for bearing the pendulum swing of the motor base above the chassis around a first axis along a trace of a beam spot of an optical pickup to a disc placed on the turntable and the flapping of the motor base around a second axis on the motor base for intersecting at the right angle the beam spot trade in parallel with the disc surface, a device for holding the motor base on the motor base bearing system, a first adjusting member mounted on the chassis for adjusting the pendulum swing attitude of the motor base around the first axis and a second adjusting member mounted on the chassis for adjusting the flapping attitude of the motor base around the second axis.

25 Claims, 16 Drawing Sheets

DISC REPRODUCING APPARATUS WITH MOTOR BASE BEARING SYSTEM

FIELD OF THE INVENTION

The present invention relates to a disc reproducing apparatus for playing the optical disc such as CD (Compact Disc), CD-ROM, DVD (Digital Versatile Disc), DVD-ROM, and more particularly, to a skew adjusting system of the disc reproducing apparatus.

BACKGROUND OF THE INVENTION

In the disc drive for playing high-density optical discs such as CD players, DVD players, CD-ROM drives or DVD-ROM drives, it is necessary to adjust the direction of the optical axis of the optical pickup to intersect at the right angle the disc surface (skew adjustment) in the assembly process. As the skew adjustment, the following methods have been conventionally performed.

FIG. 23 shows the skew adjustment by adjusting the heights of three fulcrums among four fulcrums which are rotatably mounted on a chassis for supporting respective ends of two guide rods 102, 102 for guiding the optical pickup 101 along a disc surface. The height of each fulcrum is adjusted by rotating the fulcrum itself so that a helical cam 103 defined on the fulcrum lifts up or down its associated end of the guide rod 102.

FIG. 24 shows another conventional skew adjustment in which three portions of a motor base supporting a motor 104 are adjusted their heights by screws 105.

The skew adjustment is comprised of a tangential skew adjustment and a radial skew adjustment. The tangential skew adjustment adjusts the optical axis of the optical pickup to intersect at the right angle the disc surface, seen from the direction of a trace of the beam spots of the optical pickup, i.e., a normal on the disc surface. The radial skew adjustment adjusts the optical axis of the optical pickup to intersect at the right angle the normal line, seen from the direction intersecting at the right angle the disc surface.

The conventional skew adjustments as shown in FIGS. 21 and 22 have a following. For example, in the former one (FIG. 21), i.e., the skew adjustment by adjusting the attitude of optical pickup, the adjustment at each end of guide rods badly influences with each other. That is, since it is impossible to independently perform the tangential skew adjustment and the radial skew adjustment, there is required a lot of times and labors for completing the skew adjustment. Because the tangential skew adjustment deteriorates the formerly completed result of the radial skew adjustment, and vice versa. The latter one (FIG. 22), i.e., the skew adjustment by adjusting the attitude of motor also has a similar problem.

SUMMARY OF THE INVENTION

The present invention has been made for solving the problems in the conventional skew adjustments. It is, therefore, an object of the present invention to provide the disc reproducing apparatus which is able to independently carried out the tangential skew adjustment and the radial skew adjustment, thus able to perform them accurately and efficiently.

In order to achieve the above object, a disc reproducing apparatus according to one aspect of the present invention includes, a motor for driving the disc, a turntable coupled to a motor shaft of the motor, a motor base for mounting the motor, a chassis for supporting the motor, a motor base bearing system mounted on the chassis for bearing the pendulum swing of the motor base above the chassis around a first axis along a trace of a beam spot of an optical pickup to a disc placed on the turntable and the flapping of the motor base around a second axis on the motor base for intersecting at the right angle the beam spot trace in parallel with the disc surface, a device for holding the motor base on the motor base bearing system, a first adjusting member mounted on the chassis for adjusting the pendulum swing attitude of the motor base around the first axis and a second adjusting member mounted on the chassis for adjusting the flapping attitude of the motor base around the second axis.

In order to achieve the above object, a disc reproducing apparatus according to another aspect of the present invention includes, a turntable for rotatably supporting a disc, a turntable base for mounting the turntable, a chassis for supporting the turntable base, a turntable base bearing system mounted on the chassis for bearing the pendulum swing of the turntable base above the chassis around a first axis along a trace of a beam spot of an optical pickup to the disc placed on the turntable and the flapping of the turntable base around a second axis on the turntable base for intersecting at the right angle the beam spot trace in parallel with the disc surface, a device for holding the motor base on the motor base bearing system, a first adjusting member mounted on the chassis for adjusting the pendulum swing attitude of the motor base around the first axis and a second adjusting member mounted on the chassis for adjusting the flapping attitude of the motor base around the second axis.

According to disc reproducing apparatus of the first aspect of the present invention, it is able to perform the tangential skew adjustment without causing a normal line aberration by adjusting the pendulum swing attitude around the first axis of the motor base on the motor base bearing system. Further, it is able to perform the radial skew adjustment without causing the normal line aberration by adjusting the flapping attitude around the second axis of the motor base on the motor base bearing system. Accordingly, it is possible to independently perform the tangential skew adjustment and the radial skew adjustment, thus achieving accurate and efficient skew adjustment.

Here, it is desirable to define the second axis on the position extending through the center of the disc. The motor base bearing system can be constructed by the member having an epicycloid surface around the first axis.

Further, by supporting the motor base in the condition that it is pressed resiliently to the chassis, it is able to prevent the play of the motor base on a chassis.

According to disc reproducing apparatus of the second aspect of the present invention, it is also able to perform the tangential skew adjustment without causing a normal line aberration by adjusting the pendulum swing attitude around the first axis of the turntable base on the turntable base bearing system. Further, it is able to perform the radial skew adjustment without causing the normal line aberration by adjusting the flapping attitude around the second axis of the turntable base on the turntable base bearing system. Accordingly, it is possible to independently perform the tangential skew adjustment and the radial skew adjustment, thus achieving accurate and efficient skew adjustment.

Here, it is desirable to define the second axis on the position extending through the center of the disc. The turntable base bearing system can be constructed by the member having an epicycloid surface around the first axis.

Further, by supporting the turntable base in the condition that it is pressed resiliently to the chassis, it is able to prevent the play of the turntable base on a chassis. Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 1 through 22.

Figure 1:
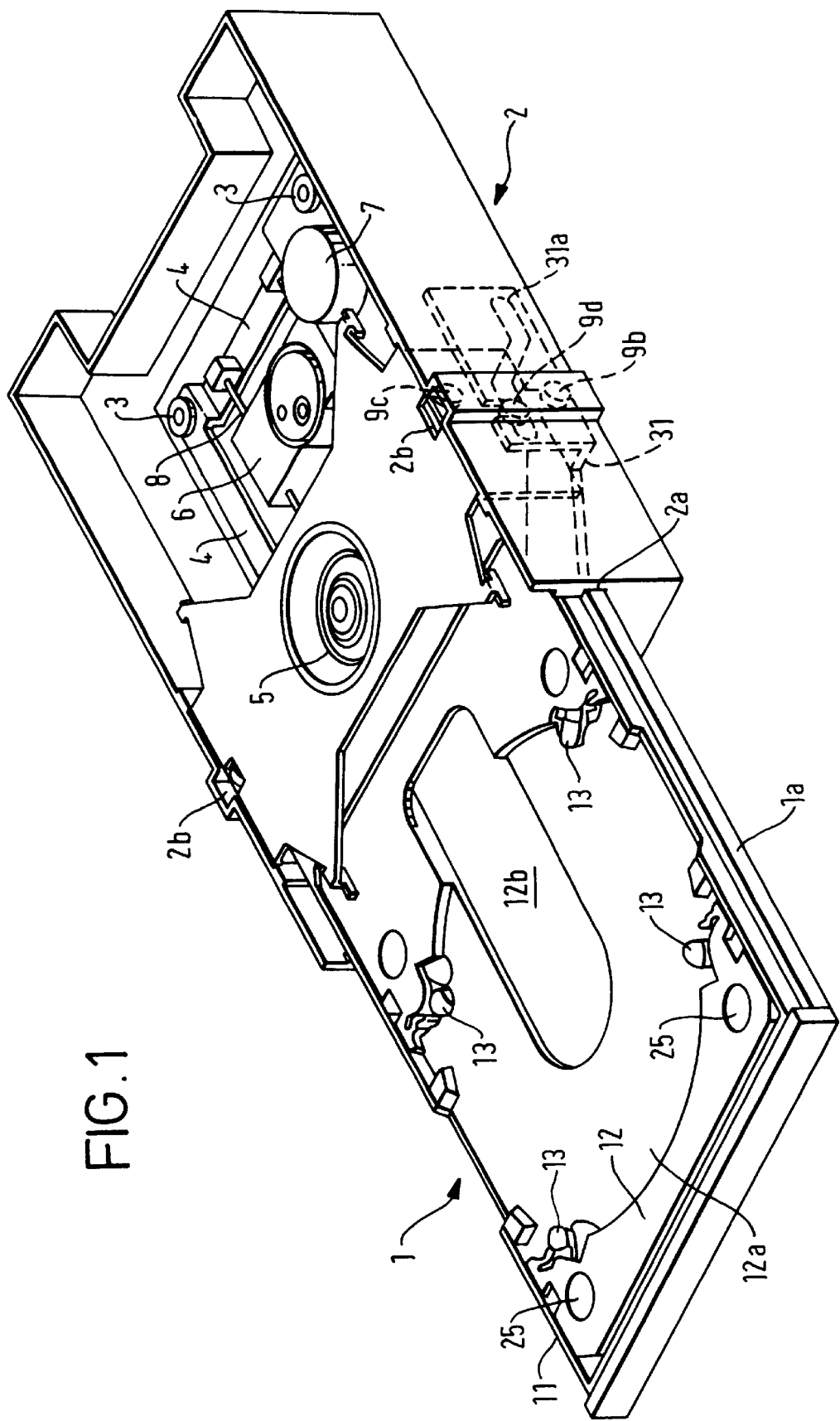
FIG. 1 is a perspective view showing the embodiment of the tray unloading state of the DVD-ROM drive according to the present invention.
Figure 2:
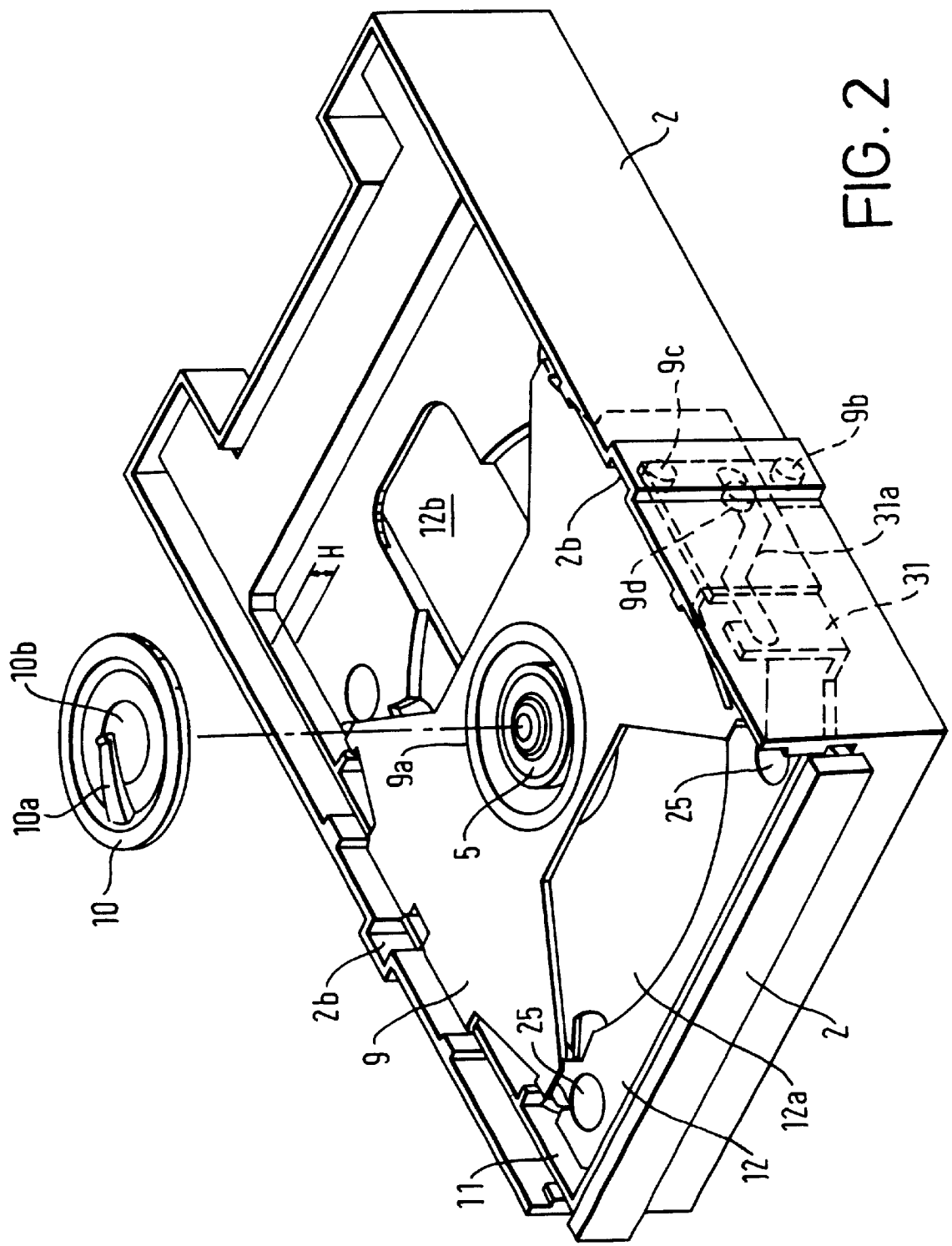
FIG. 2 is a perspective view showing a state of the disc clamping operation of the DVD-ROM drive shown in FIG. 1.

FIGS. 1 and 2 are perspective views showing the DVD-ROM drive according to the embodiment of the present invention.

The numeral 1 denotes a tray for loading or unloading a disc in or out of a disc reproducing apparatus. The numeral 2 denotes a mechanical unit of the disc reproducing apparatus. The tray 1 goes in or out the mechanical unit 2 in the direction parallel with the disc surface held on the tray 1. In each side of the tray 1 a guide rail 1a is formed, which is guided by a guide groove 2a defined on the inner housing wall of the mechanical unit 2.

On the bottom of the mechanical unit 2 a chassis 4 is mounted via a damper 3 made of rubber etc. The chassis 4 suspends thereon a disc motor for driving a turntable (not shown in FIGS. 1 and 2), an optical pickup and a pickup feed mechanism including a feed motor 7 and a guide rod 8 are mounted.

The mechanical unit 2 accommodates therein a clamper 10, a clamper holder 9 for holding the clamper 10, as shown in FIG. 2. Further the mechanical unit 2 accommodates therein a mechanism for driving a tray loading operation and a disc clamping operation.

The detail of each element or mechanism will be explained in detail hereinafter.

The tray 1 will be explained in detail in reference to FIG. 1 through FIG. 7.

The tray 1 is comprised of a tray frame 11 and a tray elevator 12 which is slidably held by the tray frame 11 in the vertical direction, i.e., in the direction vertically intersecting the disc held on the tray 1. The tray elevator 12 is defined a disc receiving recess 12a for receiving therein the disc, an aperture 12b for allowing penetrations of the turntable and optical pickup therethrough. The tray elevator 12 also has four disc fallout stoppers 13 for stopping fallout of the disc from the disc receiving recess 12a.

Figure 3:
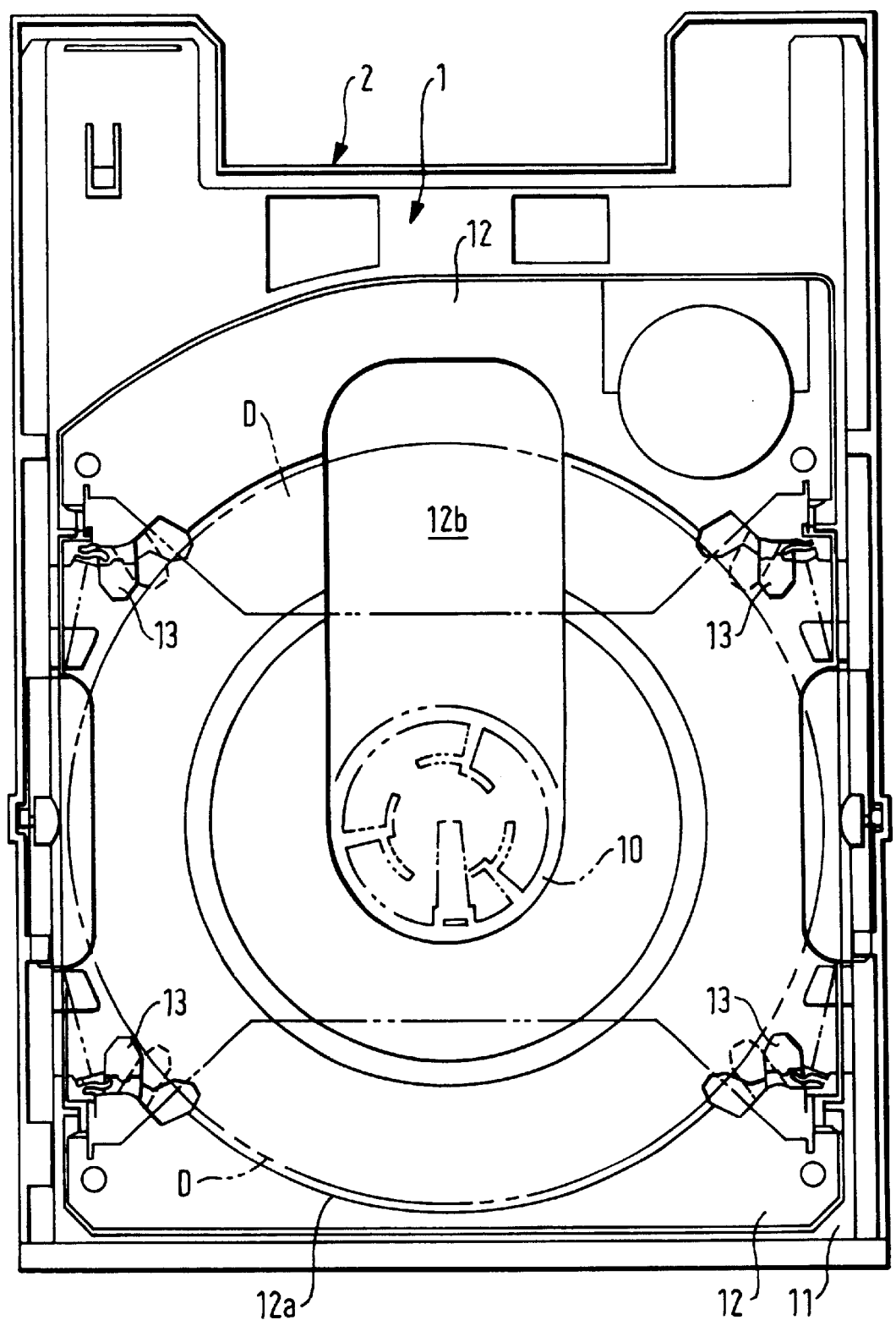
FIG. 3 is a plan view showing the state of the disc clamping operation of the DVD-ROM drive shown in FIG. 1.

Each disc fallout stopper 13, as shown in FIG. 3 is movable between the positions shown by a solid line and a dotted line. When each disc fallout stopper 13 is located on the position shown by the dotted line the disc D is in the state of being held in the disc receiving recess 12a. When each disc fallout stopper 13 takes a position depicted by the solid line, the disc D could be fallout from the disc receiving recess 12a without being stopped by the disc fallout stoppers 13. Here, FIG. 3 shows the state that the tray 1 is loaded into the mechanical unit 2, at that time the disc D is held in the disc receiving recess 12a.

Each disc fallout stopper 13 swings simultaneously with up and down movement of the tray elevator 12 to the tray frame 11. As shown in FIGS. 1 and 2, the tray elevator 12 moves up and down between the height where the its upper surface has the same level with the upper surface of the tray 11 and the other height where the upper surface of the member 12 is lowered by a fixed distance H from the upper surface of the tray frame 11. When the tray elevator 12 stays in the height where it has the same level with the upper surface of the tray frame 11, each disc fallout stopper 13 is halted in the disc fallout stopping position. When the tray elevator 12 stays in the height where the member 12 is lowered by the fixed distance H from the upper surface of the tray frame 11, the disc fallout stopper 13 is halted in the disc fallout unstopping position.

This mechanism for interlocking the up and down of the tray elevator 12 and the swing of the disc fallout stopper 13 will be explained in detail in reference to FIG. 4 through FIG. 7.

Figure 4:
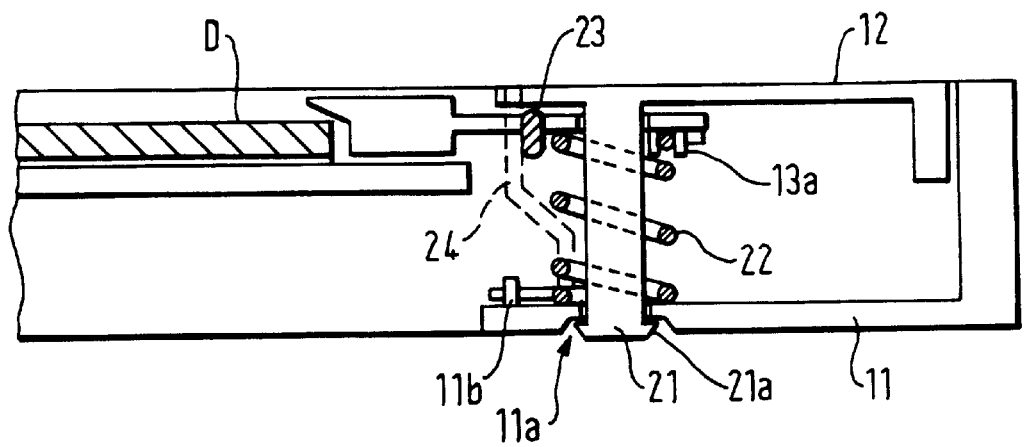
FIG. 4 is a section view showing a state of a disc being clamped on the tray in the DVD-ROM drive shown in FIG. 1.
Figure 5:
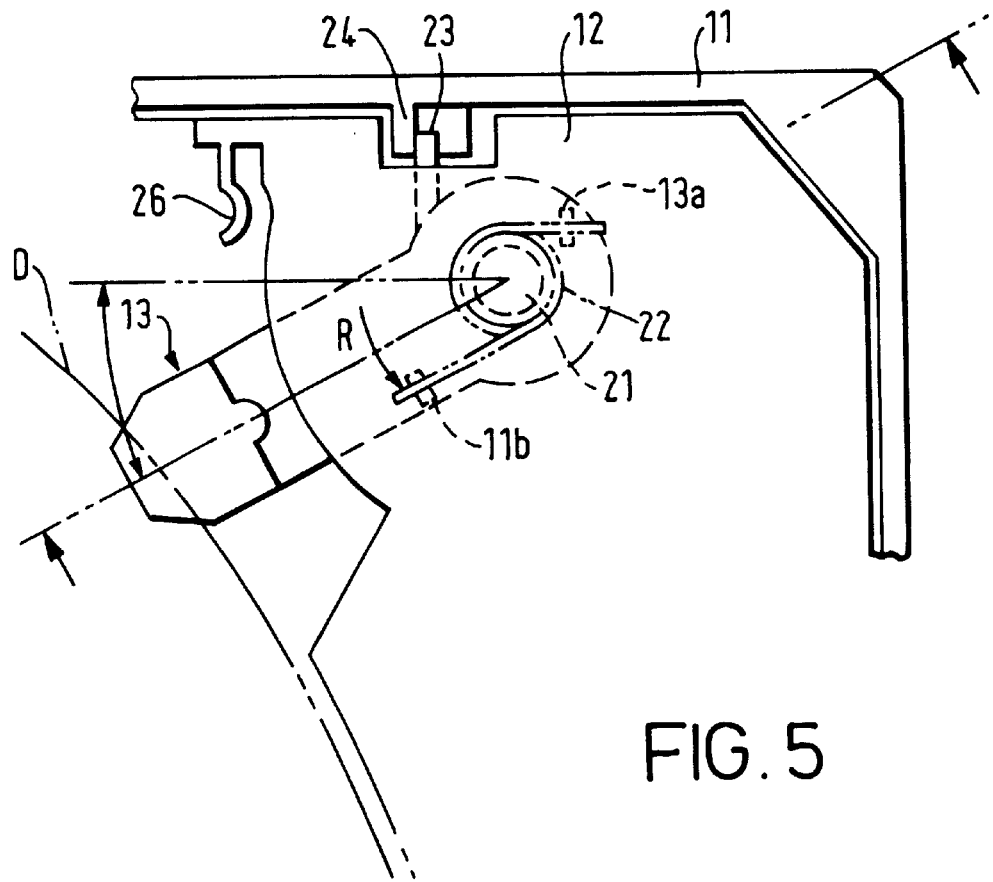
FIG. 5 is a plan view showing the tray shown in FIG. 4.
Figure 6:
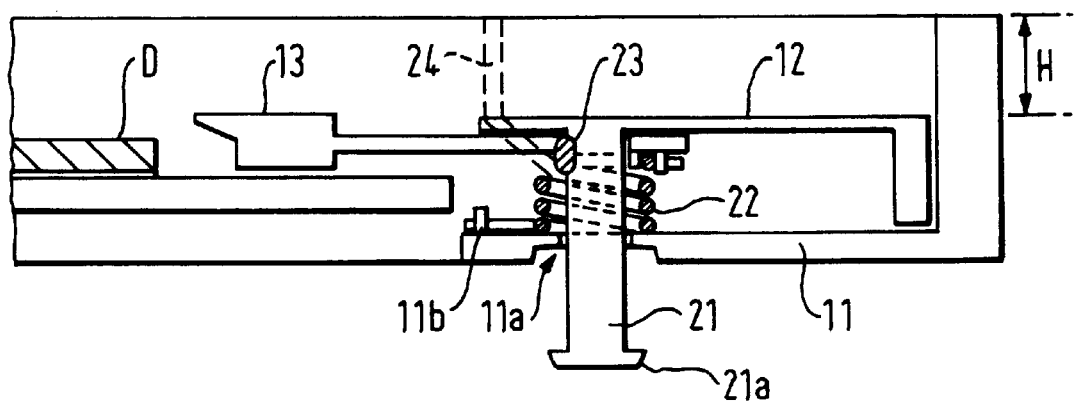
FIG. 6 is a section view showing the disc being received on the tray in a condition released from a disc fallout stopper in the DVD-ROM drive shown in FIG. 1.
Figure 7:
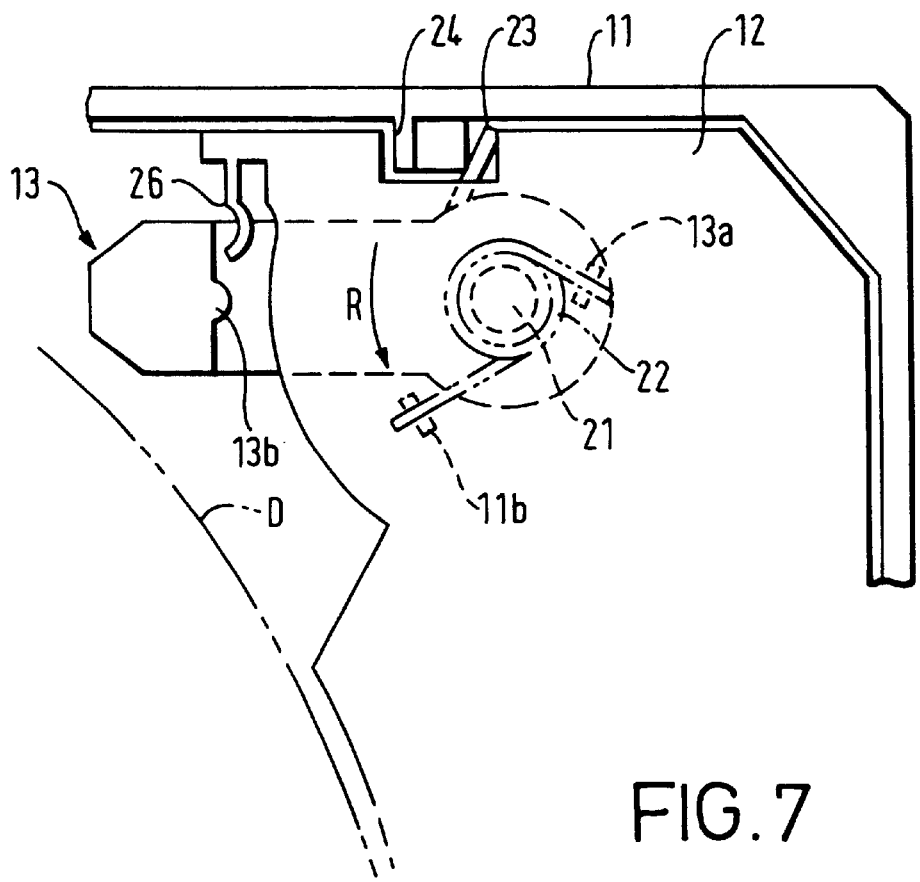
FIG. 7 is a plan view showing the tray shown in FIG. 6.

Here, FIG. 4 is a section showing around the disc fallout stopper 13 which stays in a position capable of stopping fallout of the disc D from the disc receiving recess 12a. FIG. 5 is a plan view corresponding to FIG. 4. FIG. 6 is another section showing around the disc fallout stopper 13 which stays in a position unstopping fallout of the disc D from the disc receiving recess 12a. FIG. 7 is another plan view corresponding to FIG. 6.

As shown in these drawings, each disc fallout stopper 13 is rockably held on a vertical guide pin 21 protruded from the tray elevator 12. The vertical guide pin 21 penetrates through a pin penetrating hole 11a defined on the tray frame 11. The vertical guide pin 21 is defined at its bottom end a closing head 21a for preventing the vertical guide pin 21 coming out from the pin penetrating hole 11a.

A coil spring 22 fits around the guide pin 21 and held between the tray frame 11 and the disc fallout stopper 13. The coil spring 22 biases-upwards the tray elevator 12 in the tray frame 11. The upper end of the coil spring 22 is fixed by the spring fixing member 13a of the disc fallout stopper 13, while the lower end is fixed on the spring fixing part 11b of the tray frame 11. Accordingly, the coil spring 22 also biases the disc fallout stopper 13 to turn in the direction of the arrow R.

Further, the disc fallout stopper 13 has a release pin 23 protruded therefrom in the direction parallel with the disc elevator 12. The release pin 23 engages with a pin guide 24 defined on the tray frame 11. The pin guide 24 guides the release pin 23 during the vertical movement of the tray elevator 12 for causing the disc fallout stopper 13 to turn around the guide pin 21.

An operation for placing the disc D on the tray 1 will now be explained in detail hereinafter.

Now assumed that the tray elevator 12 and the disc fallout stoppers 13 are located on positions as shown in FIGS. 4 and 5. Here the disc fallout stoppers 13 are turned in the direction R by the coil springs 22, and thus the disc D is held in the disc receiving recess 12a in the condition stopped its fallout from the by being stopped its fallout from therefrom by the disc fallout stoppers 13.

In the course of placing the disc D on the tray 1, the tray elevator 12 lowers to the bottom of the tray frame 11 against the vertical bias of the coil spring 22 by being handled with operator's fingers. As shown in FIGS. 1 and 2, the tray elevator 12 has a pointing mark 25 for indicating the best position to be put by the finger for lowering the tray elevator 12. Thus ordinary users who are inexperienced in handling the apparatus may easily know how to place the disc.

Figure 8:
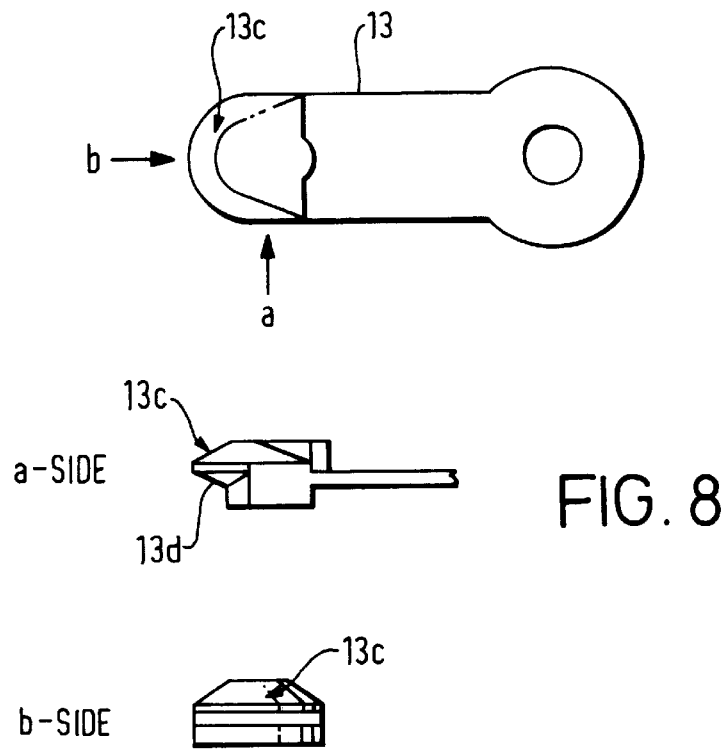
FIG. 8 is a drawing for showing the other embodiment of the disc fallout stopper.

When the tray elevator 12 is lowered, the release pin 23 protruding from the disc fallout stopper 13 is guided by the pin guide 24 defined on the tray frame 11, so that the disc fallout stopper 13 turns in the direction against the rotating bias of the coil spring 22. When the tray elevator 12 has been lowered to its bottom end, as shown in FIGS. 7 and 8, the disc fallout stopper 13 takes a disc fallout unstopping position for allowing the disc D to be placed into the disc receiving recess 12a. Then the disc D is placed in the disc receiving recess 12a of the tray 1, so that the disc placing operation to the tray will be completed.

When users remove their fingers from the tray elevator 12 the tray elevator 12 moves upwards and returns its original position. At the same time, each disc fallout stopper 13 turns in the direction of the arrow R to stop fallout of the disc from the disc receiving recess 12a of the tray 1.

In FIG. 7, the numeral 26 denotes a hook for halting the disc fallout stopper 13 in the disc fallout unstopping position. When the disc fallout stopper 13 turns in the direction against the rotation bias of the coil spring 22, a protrusion 13b defined on the disc fallout stopper 13 engages with the hook 26. Thus the disc fallout stopper 13 is halted in the disc fallout unstopping position. When the disc reproducing apparatus such as a DVD-ROM drive is placed in the horizontal position, the disc fallout stopper 13 will be unnecessary because the disc can stably take place in the disc receiving recess 12a owing to the gravity. In this case, it is desirable to halt always the disc fallout stopper 13 in the disc fallout unstopping position.

Figure 9:
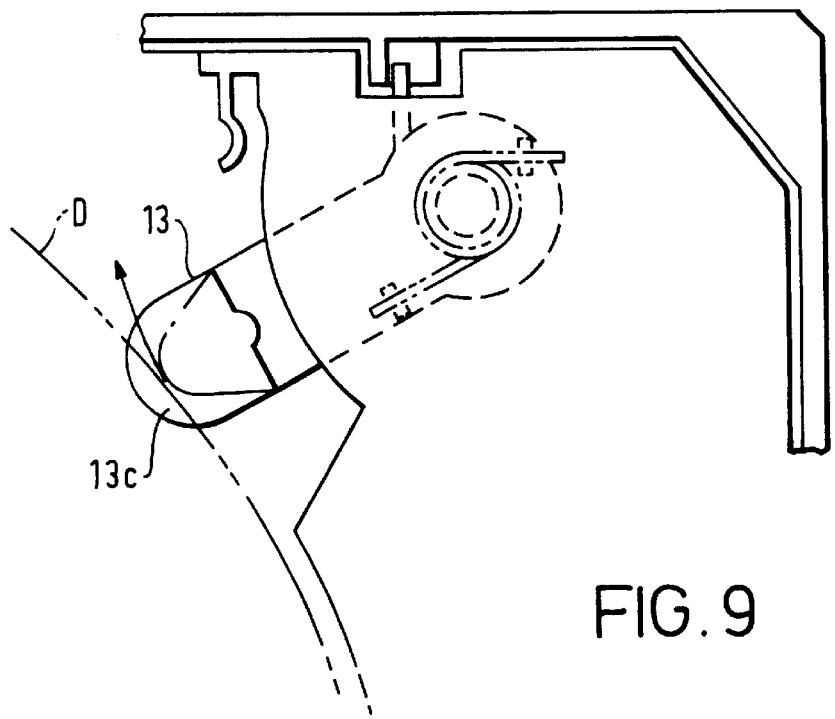
FIG. 9 is a plan view for explaining the operation of the disc fallout stopper shown in FIG. 8.

Here, as shown in FIGS. 8 and 9, an inclined surface 13c may be defined on the upper surface of the disc fallout stopper 13. The upper inclined surface 13c thus hits against the peripheral edge of the disc D in the course of placing the disc D. The disc fallout stopper 13 is then turned to its disc fallout unstopping position against the rotation bias of the coil spring 22 according to the inclined surface 13c. The disc D is thus placed on the tray 1 without pushing the tray elevator 12 down by fingers.

When the disc reproducing apparatus is placed in the vertical position, firstly the lower peripheral edge of the disc D is placed under two of lower side disc fallout stoppers 13 which take the disc fallout stopping positions. Here each of the disc fallout stoppers 13 is defined at its back another inclined surface 13d for aiding the insertion of the lower peripheral edge of the disc D under the disc fallout stopper 13. Thus the lower peripheral edge of the disc is easily engaged with the disc fallout stoppers 13 without urging the disc to the disc fallout stopping position. Then the upper peripheral edge of the disc D is pressed into the disc receiving recess 12a by turning two of the upper side disc fallout stoppers 13 to their disc fallout unstopping positions against the coil springs 22. When the upper peripheral edge has entered in the disc receiving recess 12a, the upper side disc fallout stoppers 13 return to their original disc fallout stopping positions. Accordingly, the disc can be easily placed in the disc receiving recess 12a of the tray 1 by one hand handling, and then stationary held without coming off therefrom.

Further the lower inclined surface 13d of the disc fallout stopper 13 hits against the peripheral edge of the disc to turn the disc fallout stopper 13 to the disc fallout unstopping position when the disc is took out from the tray 1, in similar to the upper inclined surface 13c of the disc fallout stopper 13. Accordingly, the disc can be also easily took out from the tray 1 by one hand handling.

The disc clamp mechanism will be now explained in detail in reference to FIGS. 1, 2, 10 and 11.

As shown in FIGS. 2 and 10, the clamper 10 is supported on the clamper holder 9 by fitting in a hole 9a defined on the clamper holder 9. The clamper 10 is also depressed downwards by the upper housing wall 51 of the mechanical unit 2.

The clamper 10 is provided with a leaf spring 10a. The leaf spring 10a protrudes upwards from the clamper 10.

When the leaf spring 10a engages with the upper housing wall 51, the leaf spring 10a biases downwards the clamper 10 to stably fit the clamper 10 in the hole 9a of the clamper holder 9. Further, the clamper 10 installs therein a magnet 10b for magnetically attracting the turntable 5 or a metal piece embedded in the turntable 5. Alternatively the magnet 10b can be installed around the turntable 5 or the turntable center boss 5b, and while a corresponding metal piece board may be equipped in the clamper 10.

As shown in FIGS. 1 and 2, the clamper holder 9 has three clamp guide pins 9b, 9c and 9d on its each side bent portion which extends downwards. Two of the guide pins, i.e., pins 9b and 9a fit in a vertical guide groove 2b defined on the side housing wall of the mechanical unit 2, while the other guide pin 9d fits in a cam slit 31a defined on a clamp slider 31 which will be described later.

The clamp slider 31 is driven to go forward and backward by its associated driving mechanism as described later in the directions defined in accordance with the tray loading and unloading operations in of tray 1. The guide pin 9d of the clamper holder 9 is located in the highest position of the cam slit 31a defined on the clamp slider 31 when the tray is being unloaded, as shown in FIG. 1. While as shown in FIG. 2, it is located in the lowest position of the cam slit 31a when the tray 1 locates at a disc clamp completion position in the mechanical unit 2. That is, the clamp holder 9 is so constructed to move up and down according to the movements of the clamp slider 31.

The vertical guide groove 2b defined on the side housing wall of the mechanical unit 2 guides the guide pins 9b and 9c of the clamper holder 9 in the vertical direction. Thus the clamper holder 9 can move in the vertical direction, i.e., in the direction intersecting the disc D placed on the tray 1.

The disc clamp operation will be now explained in detail in reference to FIGS. 10a through 10c and FIGS. 11a through 11c.

Figure 10A:
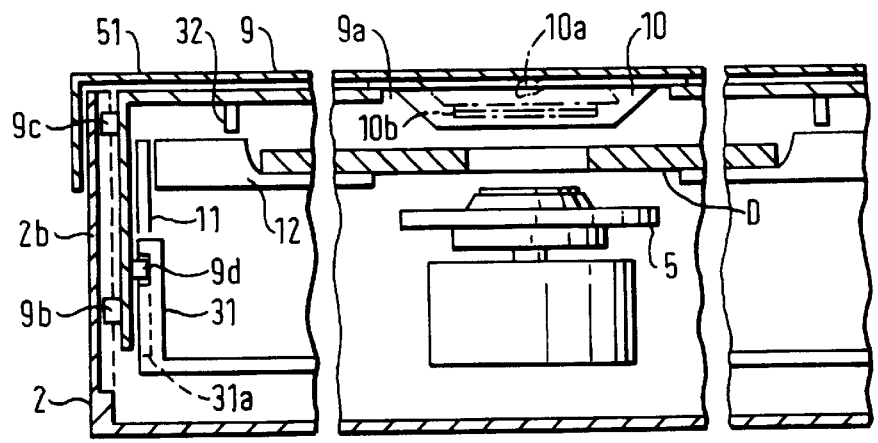
FIG. 10 is a section view showing the disc clamp mechanism of the DVD-ROM drive shown in FIG. 1 and its operation.
Figure 11A:
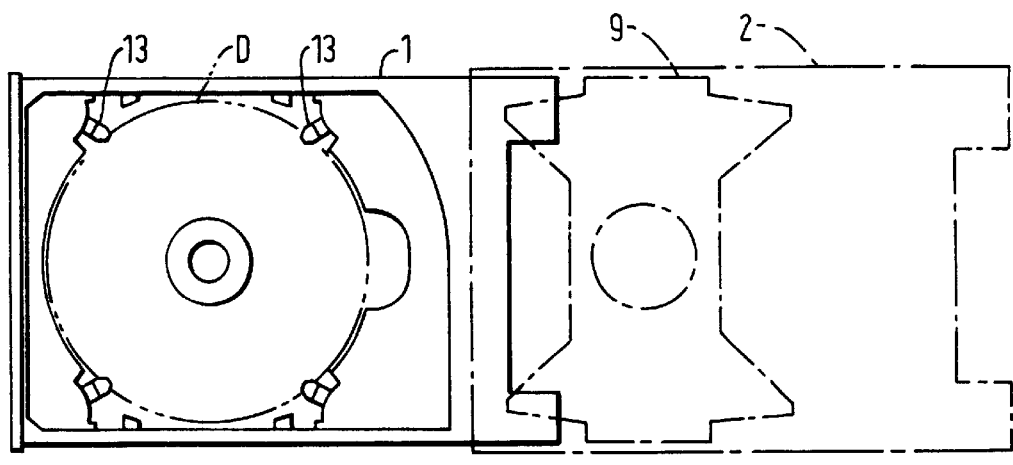
FIG. 11 is a plan view showing the state of the disc fallout stopper in the tray loading operation.
Figure 11B:
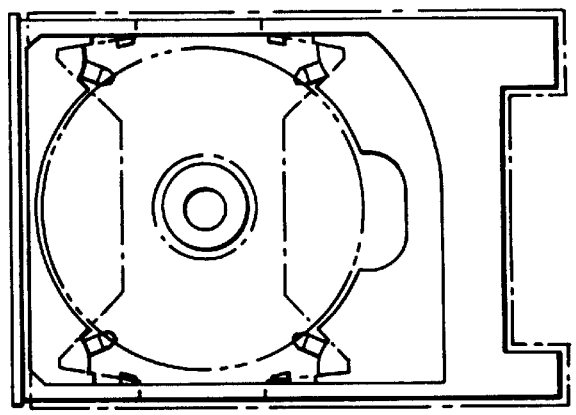

FIG. 10a shows state that the tray 1 had just loaded in the mechanical unit 2. The state of FIG. 10a corresponds to plane view as shown in FIG. 11b just following the plan view as shown in FIG. 11a. In this state, the clamper 10 stays in its highest position, i.e., a position contacting the upper housing wall 51 of the mechanical unit 2. That is, when the tray 1 has reached a predetermined position inside the mechanical unit 2, the tray loading having been completed, as shown in FIG. 11b. At this time, a disc clamp operation starts. That is, the clamp slider 31 is activated to lower the clamper holder 9.

Figure 10B:
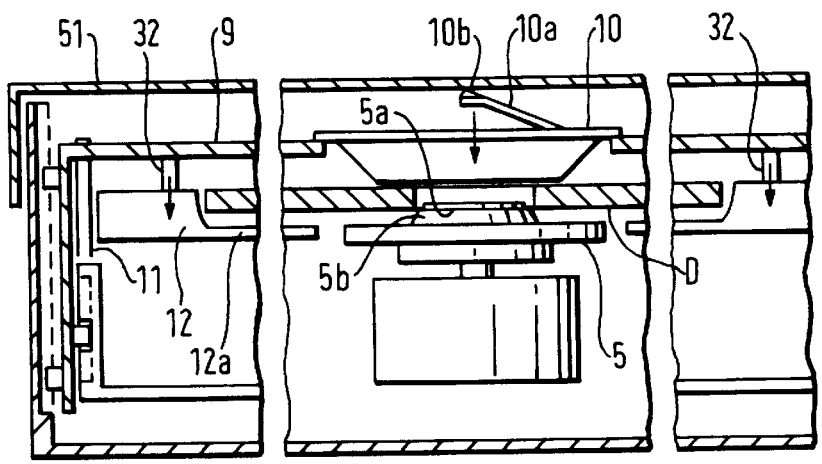

FIG. 10b shows the state that the clamper holder 9 in the way of lowering toward the tray 1 already loaded in the mechanical unit 2. When the clamper holder 9 lowers, that is, the clamper holder 9 goes away from the upper housing wall 51, the clamper 10 also lowers together with the clamper holder 9 by being biased downwards by the leaf spring 10a without coming off the clamper holder 9.

Figure 11C:
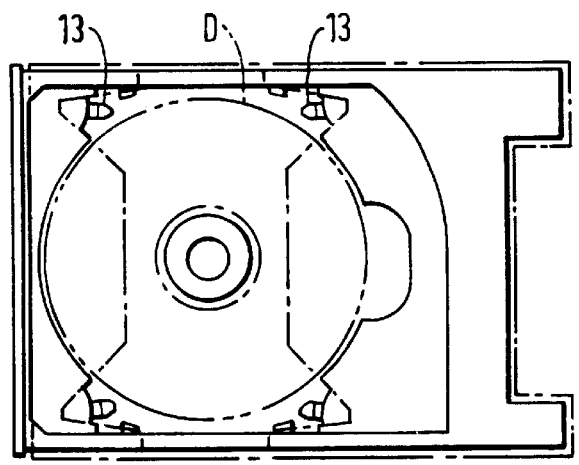

According to the lowering of the clamper holder 9, a tray operating pin 32 protruding downwards from the clamper holder 9 presses the tray elevator 12 to lower it in inside of the tray frame 11. The disc D is thus detached from the tray 1, as shown in FIG. 11c.

According to the lowering of the tray elevator 12, the disc D placed on the tray 1 is detached from the disc receiving recess 12a of the tray 1, and then placed on the turntable 5. According to a further lowering movement of the tray elevator 12, the distance between a turntable center boss 5a of the turntable 5 and the clamper 10 is shortened. The turntable center boss 5a then fully fits into the center hole of the disc D by the magnetic attraction between the magnet 10a and its corresponding metal piece equipped in the clamper 10 and the turntable 5.

Figure 10C:
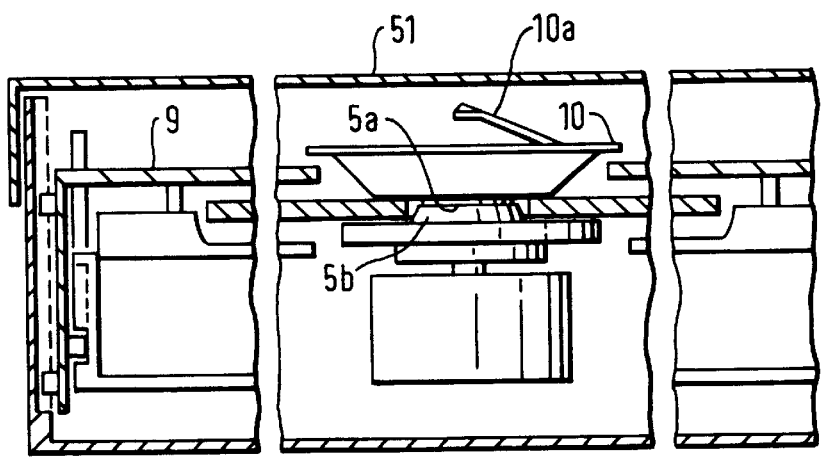

FIG. 10c shows the state that the disc clamp has been completed. In this state, the clamper 10 is located at the position where it is floating from the clamper holder 9, and the leaf spring 10a of the clamper 10 is coming off the upper housing wall 51. Here, the turntable center boss 5a has a centering number 5b for centering the disc, which is resiliently held via a spring housed in the turntable center boss 5a. The centering member 5b defined a taper surface on its peripheral. Thus the centering member 5b accurately centers the disc D in the position concentric with the turntable 5 when the taper surface of the centering member 5b fits with the center hole of the disc D in the course of clamping the disc D in cooperation with the clamper 10. The centering member 5b is lowered against the spring in the turntable center boss 5a by the clamper 10 in the clamping operation.

The tray loading mechanism and the disc clamp mechanism will now be explained in detail in reference to FIGS. 12 through 15.

Figure 12:
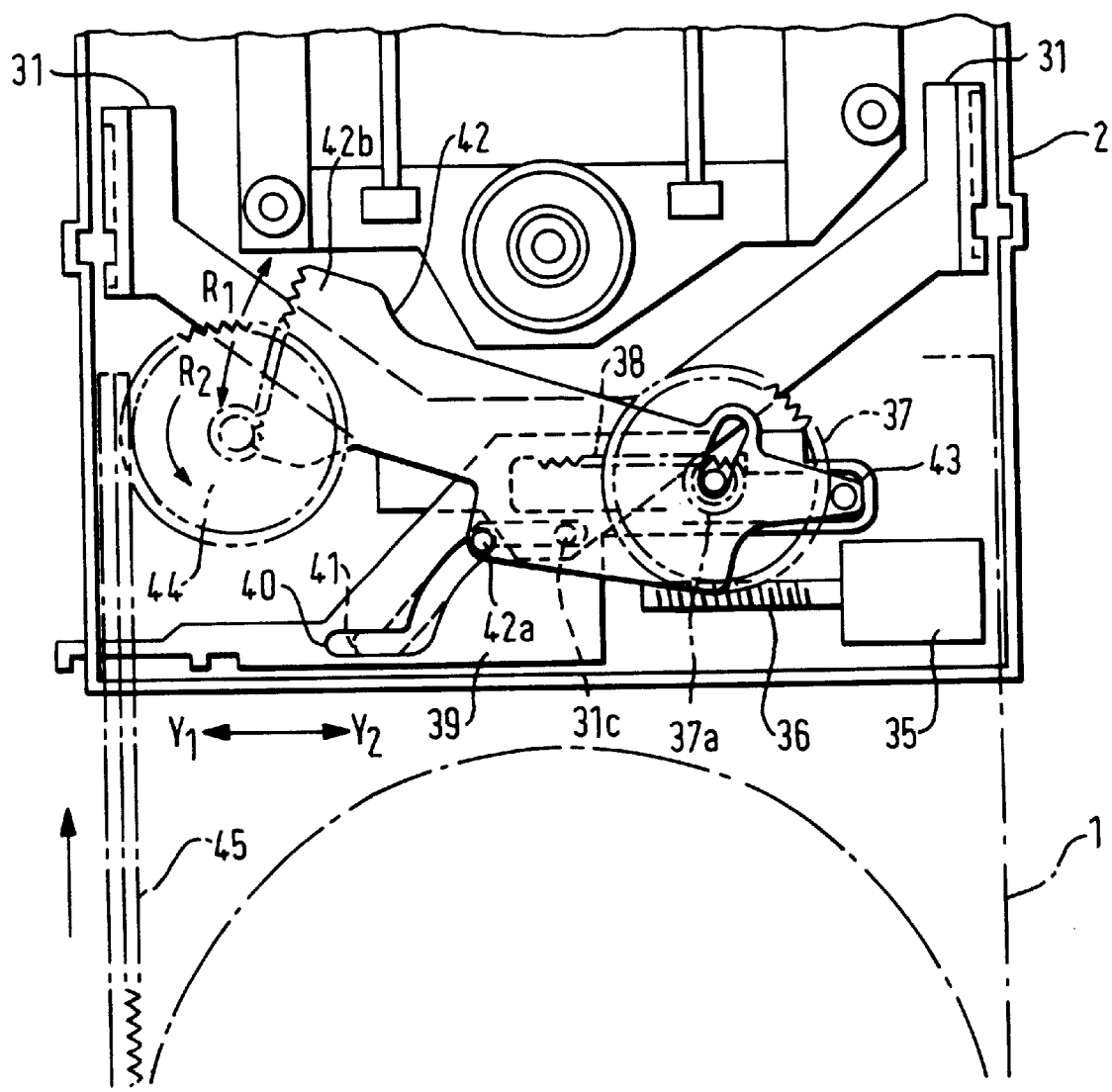
FIG. 12 is a plan view showing states of the tray loading mechanism and the disc clamp driving mechanism in a tray unloading operation.
Figure 13:
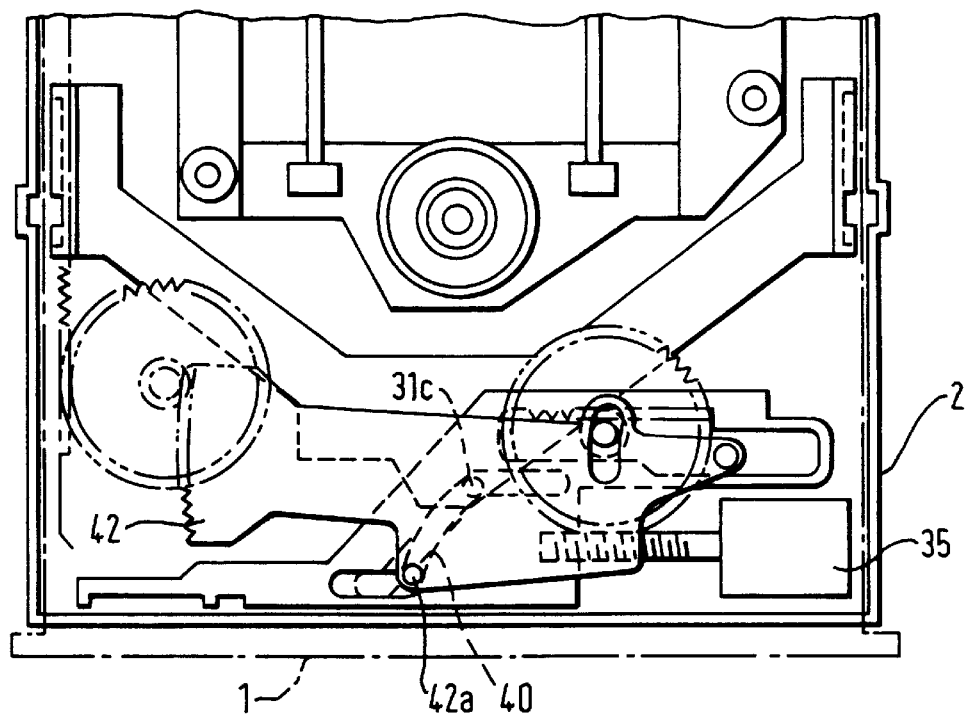
FIG. 13 is a plan view showing the state of the tray loading mechanism and the disc clamp driving mechanism after the completion of the tray loading operation.
Figure 14:
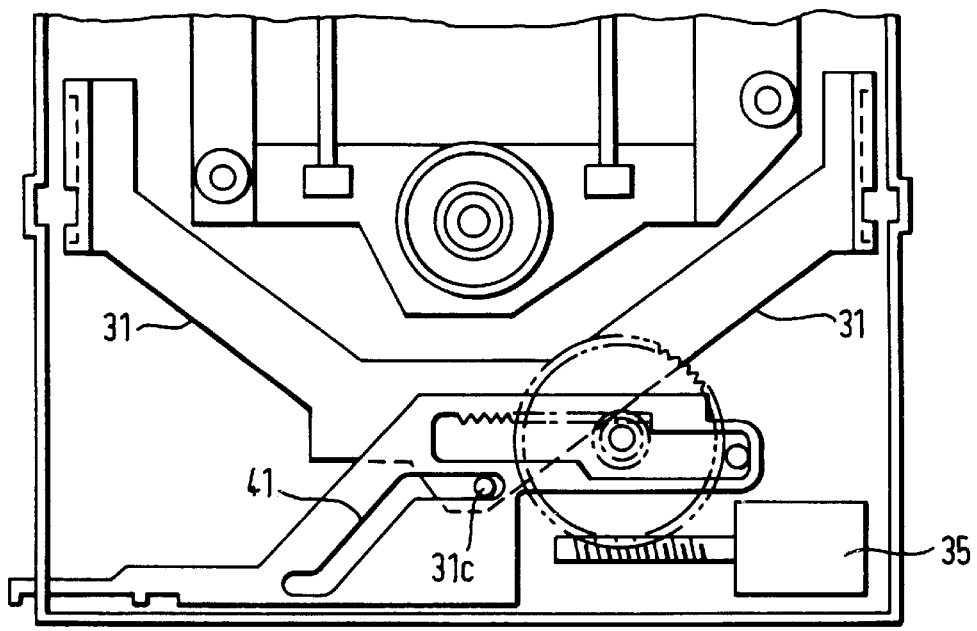
FIG. 14 is a plan view showing the state of the disc clamp driving mechanism in the tray unloading operation.
Figure 15:
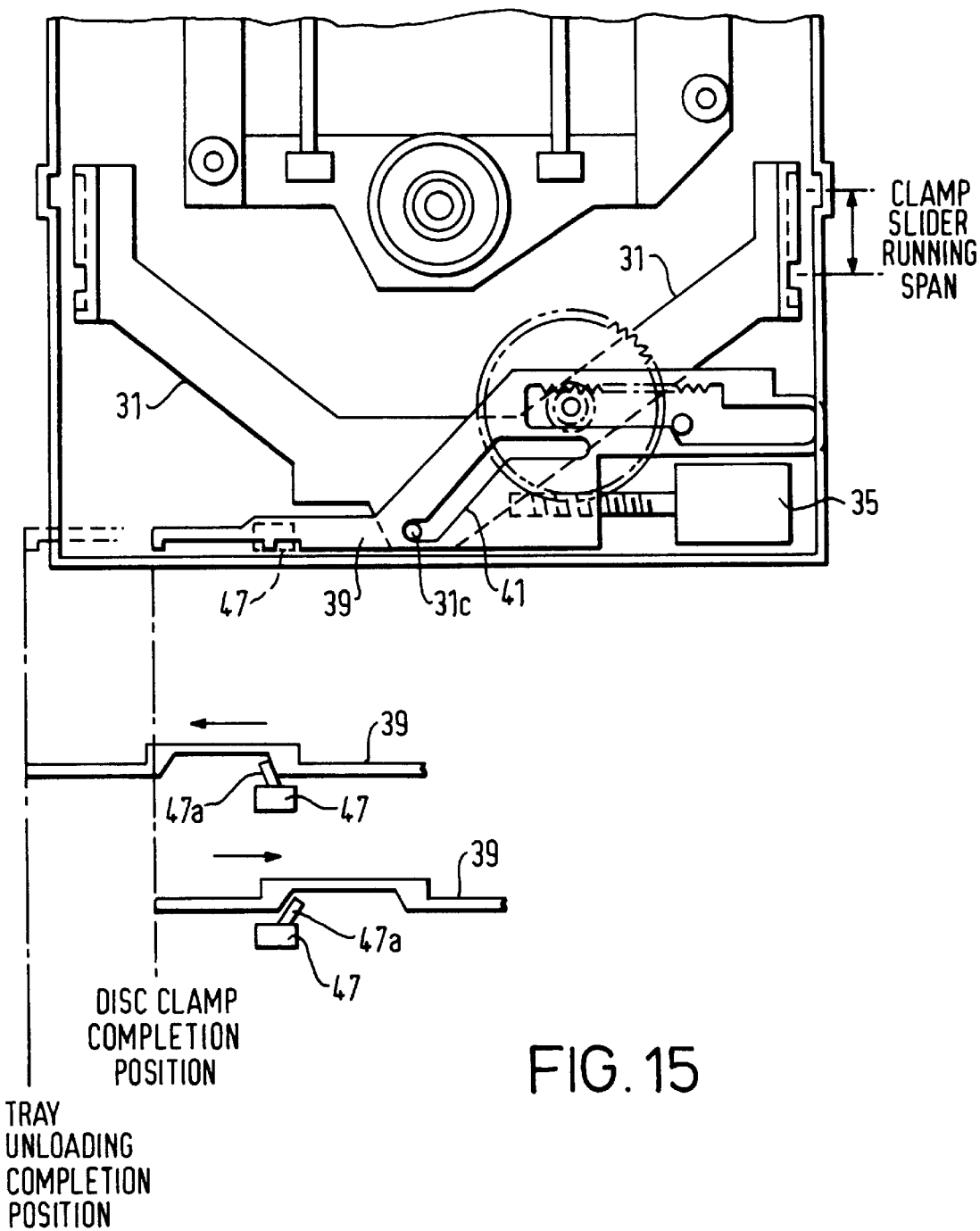
FIG. 15 is a plan view showing the state of the tray loading/disc clamp driving mechanism after the completion of the disc clamping operation.

FIGS. 12 and 13 show the entire of the tray loading and disc clamp mechanism. FIGS. 14 and 15 show another mechanism associated only to the disc clamping.

FIGS. 12 and 14 show a tray unloading state prior to the tray loading operation (see FIGS. 1 and 11a). FIG. 13 shows a tray loading completing state (see FIG. 11b). FIG. 15 shows a disc clamping completing state (see FIGS. 2 and 11c).

In FIG. 12, the numeral 35 denotes a motor. The power of the motor 35 is transmitted to a gear 37 via a warm gear 36. The power is further transmitted to a slider 39 via a gear 37a which is coaxial with the gear 37 and a rack gear 38. Accordingly, the slider 39 slides in the direction of the arrow Y2.

The slider 39 is defined therein a pair of cam grooves 40 (shown by solid line) and 41 (shown by dotted line). The cam groove 40 engages with a guide pin 42a mounted on an arm 42 which will be described later. The other cam groove 41 engages with the guide pin 31c mounted on the clamp slider 31 which will be also described later. The guide pins 42a and 31c are thus guided by the cam grooves 40 and 41 during the slide movement of the slider 39, so that the arm 42 and the clamp slider 31 are driven in following the guide pins 42a and 31c, respectively.

The arm 42 rocks laterally around the center of its rocking axis 43 in the directions of arrows R1 and R2, under the guide of the guide pin 42a which is driven by the slider 39. Here in the positional state as shown in FIG. 12, the arm 42 rocks in the direction of the arrow R2. The arm 42 is defined at its free end a rack gear 42b which engages with a gear 44. The gear 44 meshes with a loading rack gear 45 defined on the tray 1. Therefore, the rocking of the arm 42 in the direction of the arrow R2 causes the loading operation of the tray 1 into the mechanical unit 2.

The rocking range of the arm 42 is limited by the cam groove 40 defined on the slider 39. That is, the arm 42 rocks between the position where the guide pin 42a is located in the position, as shown in FIG. 12 and the other position, as shown in FIG. 13. Here, the cam groove 40 for guiding the guide pin 42a of the arm 42 is shaped so as to guide the guide pin 37a along the moving direction of the slider 39 (Y2 direction) extending further from the pin position of the arm rocking end shown in FIG. 13.

On the other hand, as shown in FIGS. 14 and 15, the clamp slider 31 is held in the mechanical unit 2 so as that the clamp slider 31 is movable within a predetermined range along the loading direction of the tray 1 by a suitable guide member (not shown).

The guide pin 31c of the clamp slider is driven from the position as shown in FIGS. 12 and 14 to the position as shown in FIG. 15, under the guide of the cam groove 41 according to the movement of the slider 39. The guide pin 38a of the clamp slider 31 stays in a predetermined position until the guide pin 42a of the arm 42 reaches the arm rocking end, as shown in FIG. 13, thus the clamp slider 31 also stays in a predetermined position.

The slider 39 slides in the same direction continuously after the guide pin 42a of the arm 42 has reached the arm rocking end position, as shown in FIG. 13. According to the slide movement of the slider 39 after the completion of the arm rocking, as shown in FIG. 15, the guide pin 31c of the clamp slider 31 is guided in the tray unloading direction, so that the clamp slider 31 moves in the same direction.

When the tray unloading movement of the clamp slider 31 the clamp holder 9 lowers as shown in FIG. 2, the guide pin 9d of the clamp holder 9 is guided upwards to the lowest position of the cam slit 31a defined on the clamp slider 31, so that the disc clamp is performed.

By the way, in FIG. 15, the numeral 47 denotes a switch for detecting a specific position of the slider 39. When the slider 39 reaches the tray unloading completion position in the tray unloading operation, and when the slider 39 reaches the disc clamp completion position during the disc loading operation a switch knob 47a is operated back and forth by the slider 39. Thus the disc clamp completion position is electrically detected by the switch 47.

The skew adjusting mechanism of the disc motor will be now explained in detail in reference to FIG. 16 through FIG. 22.

Figure 16:
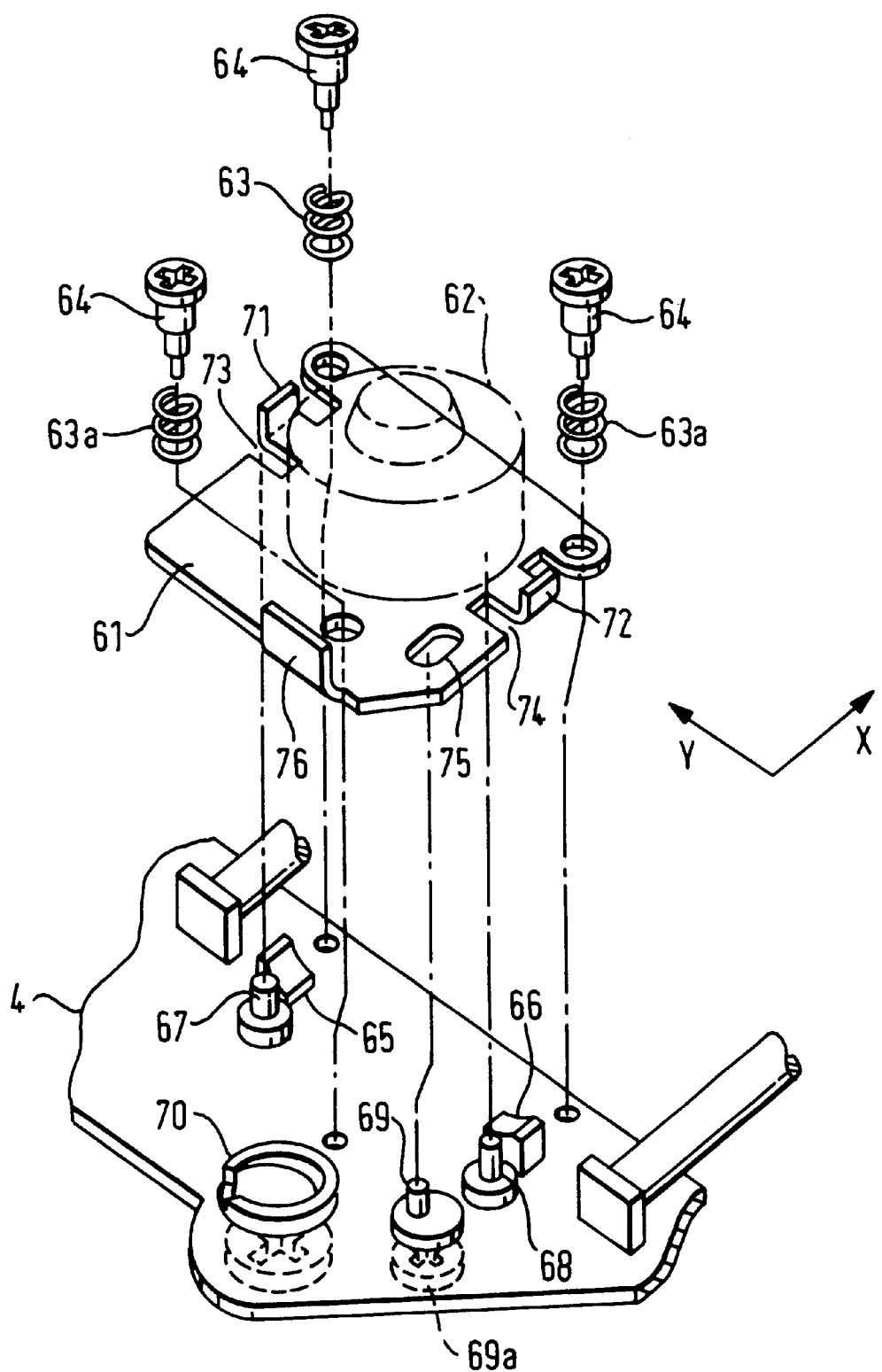
FIG. 16 is a exploded perspective view showing the construction of the skew adjusting mechanism of the disc motor of the embodiment according to the present invention.

In FIG. 16, the numeral 61 denotes a motor base on which a disc motor 62 is fixed. The numeral 4 denotes a chassis with which the motor base 61 and the optical pickup feed mechanism are held. The motor base 61 is installed on the chassis 4 by screws via coil springs 63. At the motor base installing position of the chassis 4 the skew adjusting mechanism of the disc motor 62 is defined.

The skew adjusting mechanism is comprised of a pair of pendulum bearings 65 and 66 for the sake of the tangential skew adjustment, a pair of guide pins 67 and 68, an eccentric pin 69, and a helical cam 70 for the sake of the radial skew adjustment.

The motor base 61 is defined thereon a pair of bearing contacts 71 and 72 associated with the pendulum bearings 65 and 66, a pair of slits 73 and 74 for positioning the motor base 61 in cooperation with the guide pins 67 and 68 loosely fit therein, an eccentric pin engaging slot 75 for engaging with an eccentric pin 69, and a cam contact attitude for contacting with the helical cam 70.

Figure 17A:
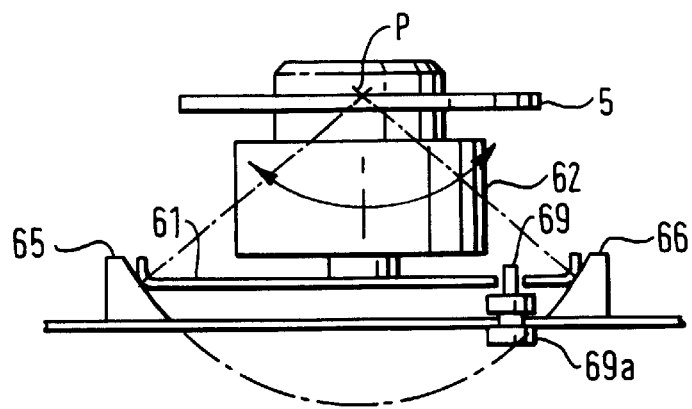
FIG. 17 is a drawing showing the detail of the tangential skew adjustment on the skew adjusting mechanism shown in FIG. 16.

First, the detail of the tangential skew adjustment will be explained in reference to FIG. 17.

As shown in FIG. 16, each of the pendulum bearings 65 and 66 has an epicycloid. These pendulum bearings 65 and 66 are arranged for making a common imaginary epicycloid around the focal point P of the light beam of the optical pickup. Thus the motor base 61 swings in the Y-axis (longitudinal) direction along the common epicycloid connecting the pair of the pendulum bearings 65 and 66 under the guide of the guide pins 67 and 68 and the slits 73 and 74.

Figure 17B:
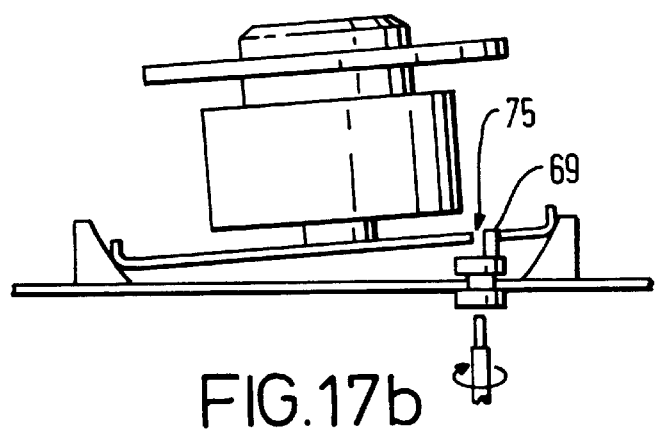
Figure 17C:
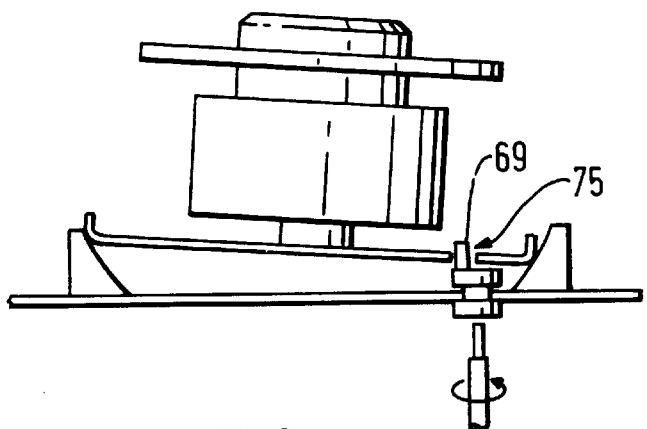

Accordingly, by adjusting the pendulum swing attitude of the motor base 61 in the Y-axis (longitudinal) direction along the common epicycloid surface connecting the premium bearings 65 and 66 at the state that the bearing contacts 71, 72 and the cam contact 76 are resiliently depressed to the pendulum bearings 65, 66 and the helical cam 70 by the coil springs 63 and the screw 64, the motor base 61 swings around the center of the trade of focal points of the light beam, as shown in FIGS. 17b and 17c. So that it is able to adjust the tangential skew without causing a normal line aberration.

The pendulum swing attitude of the motor base 61 in the Y-axis direction on the pendulum bearings 65 and 66 is adjusted by rotating the adjusting head 69a of the eccentric pin 69 from the back of the chassis 4 in use of a screwdriver.

Figure 18A:
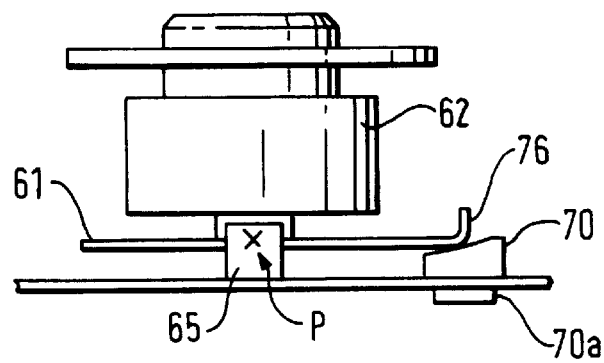
FIG. 18 is a drawing showing the detail of the radial skew adjustment in the skew adjusting mechanism shown in FIG. 16.
Figure 18B:
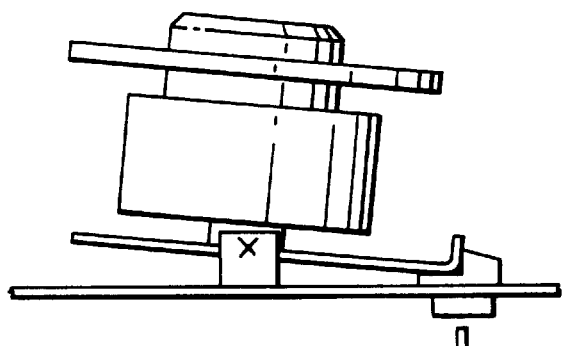
Figure 18C:
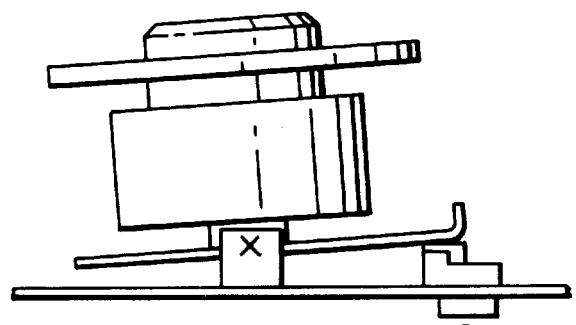

The radial skew adjustment will now be explained in detail in reference to FIG. 18. The helical cam 70 is mounted on the chassis 4 at a position along the normal line of a disc loaded in the disc reproducing apparatus. The helical cam 70 adjusts the height of the cam contact 76 defined at the edge of the motor base 61 by being rotated.

When the height of the cam contact 76 is adjusted the motor base 61 flaps around an axis extending through the centers of the bearing contacts 71 and 72, at the state that the cam contact 76 and the bearing contacts 71, 72 are resiliently depressed to the helical cam 70 and the pendulum bearings 65, 66. Here the motor base bearing 65 and 66 form the common epicycloid as described above. Thus during the radial skew adjustment the motor base 61 flaps in the X-axis (perpendicular) direction of the common epicycloid. Thus it is able to carry out the radial skew adjustment without causing the normal line aberration. The flapping attitude of the motor base 61 is adjusted by rotating the adjusting head 70a of the helical cam 70 from the backside of the chassis 4 in use of a screwdriver.

Further, in the embodiment of the present invention, the motor base 61 is held resiliently on the chassis 4 from above by the coil spring 63 and 64, so that it is possible to prevent the play of the motor base 61 on the chassis 4.

Figure 19:
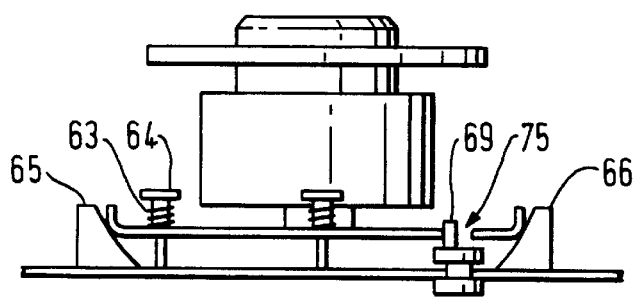
FIG. 19 is a drawing showing the using embodiment o the skew adjusting mechanism of this embodiment.
Figure 20:
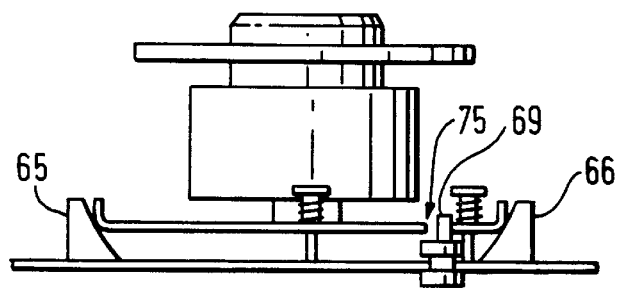
FIG. 20 is a drawing showing other using embodiment of the skew adjusting mechanism of this embodiment.
Figure 21:
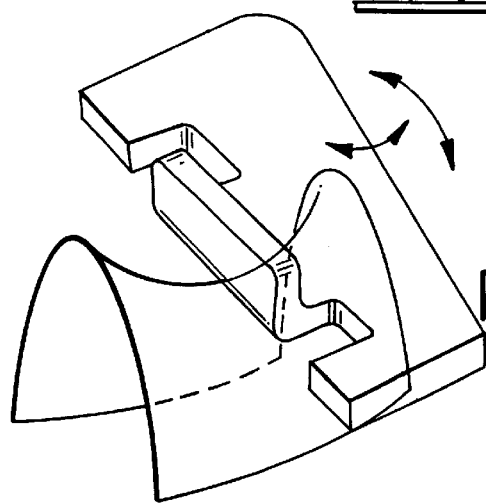
FIG. 21 is a diagram showing an example of epicycloid surface defined on a motor base bearing.

Here, in the embodiment of the present invention mentioned above, it is so constructed that the motor base 61 is biased downwards from the positions of the pendulum bearings 65 and 66 and the helical cam 70 by the coil spring 63 and the screw 64. However, in the arrangement as shown in FIG. 19, when the eccentric pin 69 engages with the left side housing wall of the eccentric pin engaging slot 75 the rightward bias by the coil spring 63 in proximity of the left side pendulum bearing 65 is received by the eccentric pin 69. In this arrangement, it is unnecessary to fix an area in proximity of the right side pendulum bearing 66 with the coil spring and the screw. Similarly, as shown in FIG. 20, when the eccentric pin 69 engages with the right side housing wall of the eccentric pin engaging slot 75 it is unnecessary to fix an area in proximity of right side pendulum bearing 65 with the coil spring and the screw.

The motor base bearing system is comprised of three bearings 65, 66 and 70 located on the chassis 4 in positions defining a space together. Thus the motor base 61 is stably supported on the three bearings 65, 66 and 70. Two of the bearings, i.e., a pair of first and second (pendulum) bearings 65 and 66 are located on the chassis 4 in opposite positions in reference to the axis of the motor 62 and form a common imaginary pendulum bearing intersecting an axis along the shaft of the motor 62. The third (cam) bearing 70 is located on the chassis 4 at a position on a line passing through axis along the motor shaft so as to intersect another line coupling the first and second bearings 65 and 66. The motor base 61 is resiliently pressed on the motor base bearing system by a resilient holding device. The resilient holding device is comprised of a first spring 63a for biasing the motor base 61 at a position in proximity of the third bearing 70 and a second spring 63b for biasing the motor base 61 at another position in proximity of at least one on the first and second bearing 65, 66 and in opposite to the first spring 63a in relation to the pendulum swing plane passing the first and second bearings 65 and 66. According to that the positions being pressed by the resilient holding device are defined as described above, the motor base 61 is stably settled on the motor base bearing system.

Figure 23:
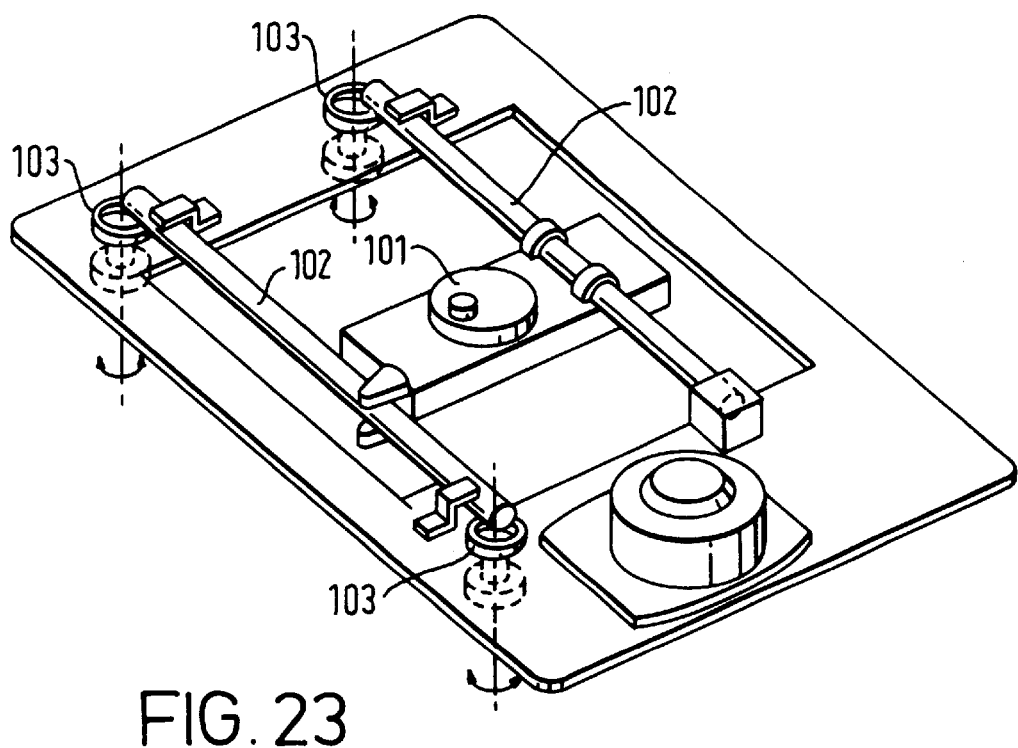
FIG. 23 is a drawing for explaining the method for conventional skew adjustment.
Figure 24:
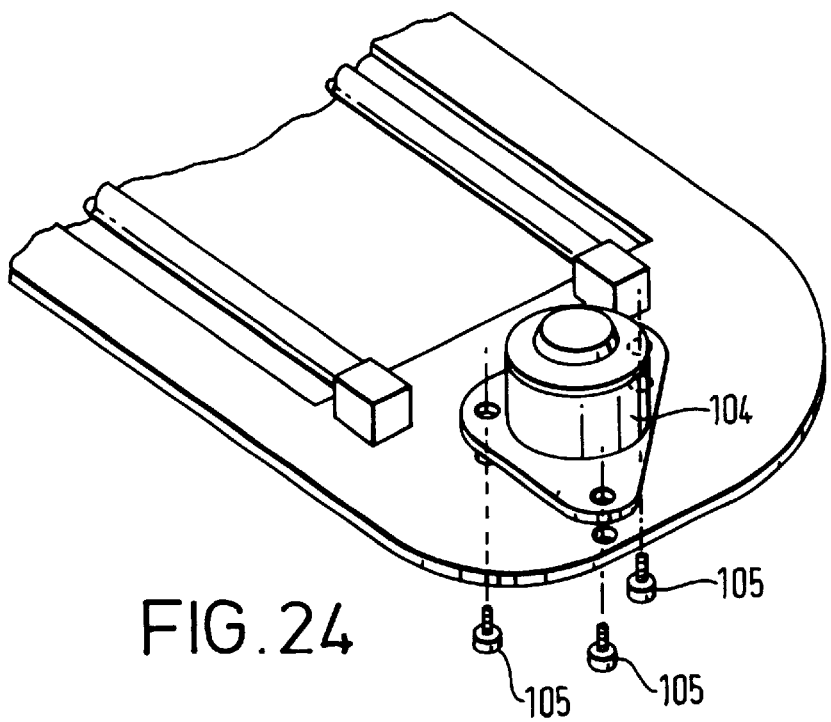
FIG. 24 is a drawing for explaining the other method for conventional skew adjustment.

The first and second bearings 65 and 66 are defined with the same dimension of epicycloids, as shown in FIG. 23, which share the pendulum swing plans.

The shape of each epicycloid makes the motor base 61 possible to flap around a line coupling two bearing points of the first and second bearing contacts 71, 72 of the motor base 61 and the first and the second bearings 65, 66 in the radial skew adjusting operation.

When the optical axis of the pickup, i.e., a light beam emitted from the pickup tilts from the vertical line to the surface of a disc placed on the turntable 5, a skew caused by the beam tilt reflects or deteriorates signals reproduced or read by the pickup from the disc. Accordingly, it is possible to bring the skew quantity to zero or minimize it, by adjusting an attitude of the motor base 61 held on the motor base bearing system, while monitoring a skew quantity of the optical pickup to the disc placed on the turntable 5 by using any known type of skew quantity calculating circuit, e.g., as disclosed in the U.S. Pat. No. 5,546,367.

Figure 22:
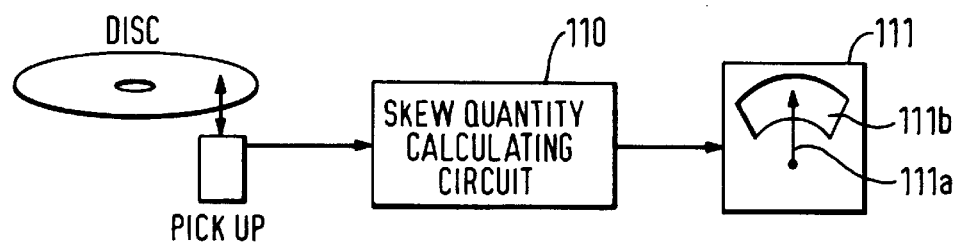
FIG. 22 is a circuit diagram showing a skew quantity monitoring device using a skew quantity calculating circuit.

FIG. 22 shows a circuit of the skew quantity monitoring device using such as the skew quantity calculating circuit 110.

In FIG. 22 a reproduced signal affected by skews is applied to the skew quantity calculating circuit. The skew quantity calculating circuit 110 calculates a skew quantity by properly processing the reproduced signal. The skew quantity calculated by the skew quantity calculating circuit 110 is then supplied to a skew meter 111. The skew meter 111 is an analog type one having a pointer 111a and a scale 111b whose center indicates a zero or minimum skew quantity. The skew meter 111 may have another scale in which the left side of the scale 111b indicates a zero or minimum skew quantity. In still another alternative, the skew meter 111 may be replaced by a digital type meter.

In a condition that the skew monitoring device is applied with the reproduced signal, either of the tangential and radial skew adjusting operations, e.g., the tangential skew adjusting operation is carried out while monitoring the skew meter so as that the meter pointer 111a reaches the zero or minimum indication. When the meter pointer 111a has reached the zero minimum indication, the tangential skew adjusting operation has been completed. Following the completion of the tangential skew adjusting operation, the other adjusting operation, i.e., in this case, the radial skew adjusting operation is carried out while monitoring the skew meter 111 so as that the meter pointer 111a reaches the zero or minimum indication. When the meter pointer 111a has reached the zero or minimum indication, the radial skew adjusting operation has been completed. That is, the entire of the skew adjusting operations have been completed.

Here in the present invention, the tangential skew adjusting operation and the radial skew adjusting operation can be independently carried out without affecting a result of the other skew adjusting operation, as described above. Thus, it is not required to repeat the respective skew adjusting operations.

The present invention is applicable to a CD/DVD combined type player and a CD-ROM/DVD-ROM combined type drive, as well as to a non-combined type player or drive for CDs, CD-ROMs, DVDs or DVD-ROMs. In such combined type players or drives, it is advantageous to carry out the skew adjustments by using DVDs or DVD-ROMs but not CDs or CD-ROMs. This is because that the DVDs and the DVD-ROMs have a heavy track-pitch in comparison to the CDs and the CD-ROMs, and thus the DVDs and the DVD-ROMs are required to have very strict skew ratings. Accordingly, once the combined type players or drives have been adjusted their skew characteristics by using a DVD or a DVD-ROM, the players or the drives are guaranteed a sufficient skew feature for the CDs or the CD-ROMs.

The skews in the disc reproducing apparatus are caused by a relative inclination between a disc surface placed on a turntable and an optical axis of a pickup for reproducing the disc, i.e., a beam tilt therebetween. Accordingly, it is able to adjust the skews by properly arranging the attitude of the disc in relation to the pickup. The attitude of the disc is adjusted through the adjustment of the attitude of the motor base in relation to the chassis for mounting the motor base. Thus the skew adjustment of the disc reproducing apparatus is possible through the motor side as well as the pickup side. However, the skew adjustment through the motor side is more advantageous than that through the pickup. That is, the pickup has a nature of running over the disc in the radial direction of the disc during a reproduction of the disc. According to the nature of the pickup, it is impossible or very difficult to adjust the attitude of the running pickup. On the other hand, the adjustment of the attitude of the motor base is very easy since the motor base is settled on the chassis.

In the above embodiment of the present invention, the skew adjusting arrangement around the motor 62 is provided with adjusting heads 69a and 70a of the eccentric pin 69 for the tangential skew adjustment and the helical cam 70 for the radial skew adjustment on the back of the chassis 4. Thus the skew adjustments can be simply and easily carried out in the adjusting process of the assembling line.

Furthermore, by defining holes on a back plate of the housing in facing the adjusting heads 69a and 70a, a serviceperson can also carry out simply and easily the skew adjustment by operating the adjusting heads 69a and 70a with screwdrivers through the holes.

The above explanation has been made for such embodiment in which the turntable is directly coupled to the motor shaft of the motor ad then the motor base mounting the motor is movably supported on the motor base bearing system. However it is possible to separate the motor from the turntable. In this case, the turntabe is driven by the motor through a power transmission bolt and the like. Then the turntabe is rotatably mounted on a member, i.e., a turntable base corresponding to the above-mentioned motor base. And then the turntable base is movably supported on a bearing system corresponding to the motor base baring system for performing the skew adjustments.

According to the disc reproducing apparatus of the present invention as described above, the tangential skew can be adjusted by adjusting the pendulum swing attitude around the first axis of the motor base (turntable base) on the motor base bearing system (turntable base bearing system) without causing the normal line aberration.

Similarly, the radial skew can be adjusted by adjusting the flapping attitude around the second axis of the motor base on the motor base bearing system without causing the normal line aberration.

Accordingly, it is possible to independently perform the tangential skew adjustment and the radial skew adjustment accurately and efficiency.

As described above, the present invention can provide an extremely preferable disc reproducing apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A disc reproducing apparatus comprising:
   a motor for driving the disc;
   a turntable coupled to a motor shaft of the motor;
   a motor base for mounting the motor;
   a chassis for supporting the motor;
   a motor base bearing system, including guiding members, mounted on the chassis, defining a surface, the motor base being in direct contact with and sliding along said surface, for bearing a pendulum swing of the motor base above the chassis around a first axis along a trace of a beam spot of an optical pickup in a direction normal to a disc placed on the turntable;
   a device for holding the motor base on the motor base bearing system; and
   an adjusting member mounted on the chassis for adjusting the pendulum swing attitude of the motor base around the first axis.

2. A disc reproducing apparatus comprising:
   a motor for driving the disc;
   a turntable coupled to a motor shaft of the motor;
   a motor base for mounting the motor;
   a chassis for supporting the motor;
   a motor base bearing system, including a member, mounted on the chassis, defining a surface, the motor base being in direct contact with and sliding along said surface, for bearing a flapping of the motor base around a second axis on the motor base intersecting at a right angle a trace of a beam spot of an optical pickup in a direction normal to a disc placed on the turntable in parallel with a disc surface;
   a device for holding the motor base on the motor base bearing system; and
   an adjusting member mounted on the chassis for adjusting the flapping attitude of the motor base around the second axis.

3. A disc reproducing apparatus comprising:
   a motor for driving the disc;
   a turntable coupled to a motor shaft of the motor;
   a motor base for mounting the motor;
   a chassis for supporting the motor;
   a motor base bearing system including guiding members, mounted on the chassis, defining a surface, the motor base being in direct contact with and sliding along said surface, for bearing a pendulum swing of a motor base above the chassis around a first axis along a trace of a beam spot of an optical pickup in a direction normal to a disc placed on the turntable and a flapping of the motor base around a second axis on the motor base intersecting at a right angle the beam spot trace in parallel with the disc surface;
   a device for holding the motor base on the motor base bearing system;
   a first adjusting member mounted on the chassis for adjusting the pendulum swing attitude of the motor base around the first axis; and
   a second adjusting member mounted on the chassis for adjusting the flapping attitude of the motor base around the second axis.

4. Disc reproducing apparatus as claimed in any one of the claims 1, 2 and 3 wherein the holding device has a biasing means for resiliently pressing the motor base on the motor base bearing system.

5. Disc reproducing apparatus as claimed in claim 1, wherein the pendulum swing bearing surface intersects another axis along the motor shaft.

6. A disc reproducing apparatus according to claim 1, wherein the member is a pair of pendulum bearings.

7. Disc reproducing apparatus as claimed in claim 2, wherein the second axis intersects another axis along the motor shaft.

8. Disc reproducing apparatus as claimed in claim 3, wherein the member, mounted on the chassis, defining the surface is a pair of first and second bearings which share a pendulum swing bearing surface intersecting a second axis along the motor shaft on opposite sides in relation to the motor shaft.

9. Disc reproducing apparatus as claimed in claim 8, wherein the pair of first and second bearings are located on a line intersecting at the right angle the beam spot.

10. Disc reproducing apparatus as claimed in claim 8, wherein each of the first and second bearings is defined with an epicycloid surface.

11. A disc reproducing apparatus according to claim 8, wherein the first and second bearings are a pair of pendulum bearings.

12. A disc reproducing apparatus comprising:
    a turntable for rotatably supporting a disc;
    a turntable base for mounting the turntable;
    a chassis for supporting the turntable base;
    a turntable base bearing system including guiding members, mounted on the chassis, defining a surface, the turntable base being in direct contact with and sliding along said surface, for bearing a pendulum swing of the turntable base above the chassis around a first axis along a trace of a beam spot of an optical pickup in a direction normal to the disc placed on the turntable;

a device for holding the turntable base on the turntable base bearing system; and an adjusting member mounted on the chassis for adjusting the pendulum swing attitude of the turntable base around the first axis.

13. Disc reproducing apparatus as claimed in claim 12, wherein the pendulum swing bearing surface intersects another axis along a shaft of the turntable.

14. A disc reproducing apparatus according to claim 13, wherein the first and second bearings are a pair of pendulum bearings.

15. A disc reproducing apparatus comprising:

a turntable base for mounting the turntable;

a chassis for supporting the turntable base;

a turntable base bearing system including a guiding member, mounted on the chassis, defining a surface, the turntable base being in direct contact with and sliding along said surface, for bearing a flapping of a turntable base around a second axis on the turntable base for intersecting at the right angle a trace of a beam spot of an optical pickup in a direction normal to the disc placed on the turntable in parallel with the disc surface;

a device for holding the turntable base on the turntable base bearing system; and an adjusting member mounted on the chassis for adjusting the flapping attitude of the turntable base around the second axis.

16. Disc reproducing apparatus as claimed in claim 15, wherein the second axis intersects another axis along the turntable shaft.

17. A disc reproducing apparatus comprising:

a turntable for rotatably supporting a disc;

a turntable base for mounting the turntable;

a chassis for supporting the turntable base;

a turntable base bearing system including bearing members, mounted on the chassis, defining a surface, the turntable base being in direct contact with and sliding along said surface, for bearing a pendulum swing of the turntable base above the chassis around a first axis along a trace of a beam spot of an optical pickup in a direction normal to the disc placed on the turntable and a flapping of the turntable base around a second axis on the turntable base intersecting at a right angle the beam spot trace in parallel with the disc surface;

a device for holding the motor base on the motor base bearing system;

a first adjusting member mounted on the chassis for adjusting the pendulum swing attitude of the motor base around the first axis; and a second adjusting member mounted on the chassis for adjusting the flapping attitude of the motor base around the second axis.

18. Disc reproducing apparatus as claimed in any one of the claims 1, 2, 3, 12, 15 and 17, wherein the holding device has a biasing means for resiliently pressing the turntable base on the turntable base bearing system.

19. Disc reproducing apparatus as claimed in claim 17, wherein the member, mounted on the chassis, defining a surface, is a pair of first and second bearings which share a pendulum swing bearing surface intersecting a second axis along the turntable shaft on opposite sides in relation to the turntable shaft.

20. Disc reproducing apparatus as claimed in claim 19, wherein the pair of bearings are located on a line intersecting at the right angle the beam spot.

21. Disc reproducing apparatus as claimed in claim 19, wherein each of the first and second bearings is defined with an epicycloid surface.

22. Disc reproducing apparatus as claimed in claim 12 or 15 further comprising:

a housing for housing the disc apparatus, and wherein the housing is defined with an opening hole facing an adjusting head of the adjusting member.

23. Disc reproducing apparatus as claimed in claim 5 or 16 further comprising:

a housing for housing the disc reproducing apparatus, and wherein the housing is defined with an opening hole facing an adjusting head of the adjusting member.

24. Disc reproducing apparatus as claimed in claim 3 or 17 further comprising:

a housing for housing the disc reproducing apparatus, and wherein the housing is defined with opening holes facing an adjusting heads of the adjusting members, respectively.

25. A disc reproducing apparatus according to claim 19, wherein the first and second bearings are a pair of pendulum bearings.

* * * * *